United States Patent Office 3,623,218
Patented Nov. 30, 1971

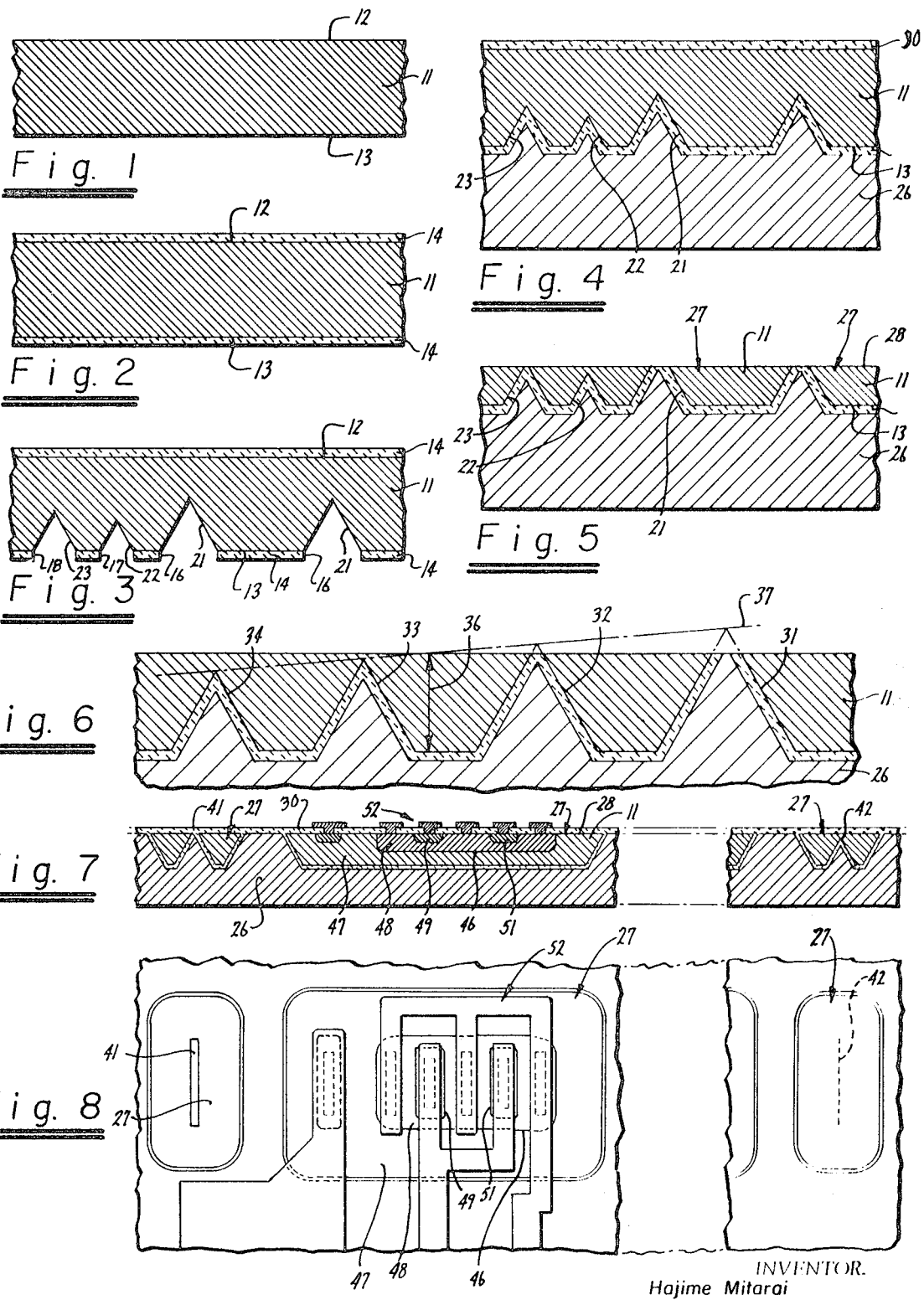

3,623,218
METHOD FOR DETERMINING DEPTH OF LAPPING OF DIELECTRICALLY ISOLATED INTEGRATED CIRCUITS
Hajime Mitarai, Sunnyvale, Calif., Carroll E. Nelson, Dallas, Tex., and Albert P. Youmans, Cupertino, Calif., assignors to Signetics Corporation, Sunnyvale, Calif.
Filed Jan. 16, 1969, Ser. No. 791,659
Int. Cl. H01l 7/00, 7/50
U.S. Cl. 29—577
7 Claims

ABSTRACT OF THE DISCLOSURE

Method and structure for determining the depth of lapping of dielectrically isolated integrated circuits utilizing at least two etched recesses which are generally V-shaped in cross-section and which have apexes at different elevations.

BACKGROUND OF THE INVENTION

In the manufacture of dielectrically isolated integrated circuit, it is generally desirable that the single crystal silicon islands which remain be very thin, i.e., approximately 10 to 20 microns, and possibly with thicknesses ranging up to 50 to 70 microns. Regardless of the thickness desired, which is dependent upon the voltage requirements, it is desirable to keep this thickness within fairly close tolerances because if the island is too thin, it will affect the breakdown voltage of the device. If it is too thick, it will affect the saturation voltage of the device. Ideally, it is desirable to maintain the desired thickness within one micron of the desired thickness. In the past, an infra-red spectrometer has been utilized for making such measurements. However, such measurements are quite time consuming and sometimes may be quite confusing because the reflecting surfaces are not true planes but rather broken pieces of planes determined by the geometry of the islands required for the device. There is, therefore, a need for a new and improved method and structure for determining the depth of lapping of dielectrically isolated integrated circuits.

SUMMARY OF THE INVENTION AND OBJECTS

In a method for determining the depth of lapping of dielectrically isolated integrated circuits, at least two grooves which are generally V-shaped in cross-section are formed in the semiconductor body so that the grooves have apexes that differ from each other in elevation or depth by predetermined increments. The semiconductor body is then lapped from the other side until at least one of the apexes of the V-shaped grooves is exposed. The semiconductor structure is provided with two V-shaped grooves which extend in from one surface of the semiconductor body and have apexes that have elevations or depths which differ from each other by predetermined increments. The apexes of the grooves are utilized as depth gauges during the lapping operation to facilitate lapping the semiconductor body to provide isolated islands having a precise depth.

In general, it is an object of the present invention to provide a method and structure for determining the depth of lapping of dielectrically isolated integrated circuits by visual inspection.

Another object of the invention is to provide a method and structure of the above character in which depth gauges can be incorporated in the integrated circuit by the same processing steps which are utilized for fabricating the integrated circuit.

Another object of the invention is to provide a method and structure of the above character in which a very precise depth control can be obtained.

Another object of the invention is to provide a method and structure of the above character which is relatively inexpensive and fool-proof.

Additional objects and features of the invention will appear from the following description in which the preferred embodiments are set forth in detail in conjunction with the accompanying drawings.

BRIEF DESCRIPTION OF THE DRAWINGS

FIGS. 1–5 are cross-sectional views showing the steps in the method incorporating the present invention for determining the depth of lapping of dielectrically isolated integrated circuits in which two depth gauges have been utilized.

FIG. 6 is an enlarged cross-sectional view showing the method and structure in which four depth gauges have been provided.

FIG. 7 is a partial cross-sectional view of an integrated circuit incorporating the present invention.

FIG. 8 is a partial top plan view of the integrated circuit shown in FIG. 7.

DESCRIPTION OF THE PREFERRED EMBODIMENTS

A wafer or slice 11 of semiconductor material of the desired impurity is utilized. For example, a monocrystalline or single crystalline silicon wafer can be used which can be doped with a desired impurity such as an N-type impurity. The wafer 11 is ground flat so that it has two parallel upper and lower sides or surfaces 12 and 13 (see FIG. 1). The wafer 11 is then placed in an oxidizing atmosphere so that an insulating layer 14 is formed over the surfaces 12 and 13 (see FIG. 2). Thereafter, by suitable photolithographic techniques, windows 16 are formed for the isolation moats and windows 17 and 18 are formed for the depth gauges. The dimensions of the windows are relatively precise for a purpose hereinafter described. Thereafter, the semiconductor structure is placed in an anisotropic etch which selectively attacks the silicon semiconductor body 11 to provide isolation moats 21 which are V-shaped in cross-section as shown in FIG. 3 and grooves or recesses 22 and 23 which are also V-shaped in cross-section but which have their apexes penetrating the semiconductor body 11 to different depths or elevations.

The anisotropic etching technique which is utilized in FIG. 3 is based upon the extreme difference in etching rates for different crystallographic planes of silicon. The anisotropic etch attacks the (100) plane much faster than the (111) plane. In fact, the etching rate is approximately thirty times faster in the (100) direction than in the (111) direction. As a consequence, there is little undercutting and a 35.3° angle is formed with respect to a line perpendicular to the planar surface 13. The depth to which the anisotropic etch will etch into the body 11 can be precisely controlled by precisely controlling the width of the window through which the anisotropic etch can attack the silicon. Thus, the narrower the width of the window, the shallower will be the depth of the recess or groove which is etched into the silicon body. This is because when the two sides of the groove, when they meet each other, form an apex and the etching action is essentially stopped. Thus, the etching of the shallower grooves or recesses is completed first and the etching continues in the others until the V or apex is formed. Thus, the depth of etching of the grooves is more or less self-controlled by the width of the window through which the etch attacks the silicon body. The anisotropic etch can be of any suitable type.

By way of example, the typical depth for the collector thickness of an integrated circuit would be 10 microns. With such a collector thickness, the minimum depth gauge which is is represented by the V-shaped recess 22 would have a depth of 7½ microns, whereas the maximum depth gauge which is represented by the V-shaped recess 23 would have a depth of approximately 12½ microns.

The isolation moats which are utilized for forming the dielectrically isolated islands as represented by the moats 21 would have a substantially greater depth as, for example, a depth of 15 microns to ensure that at the time that the maximum depth gauge 23 is contacted during lapping as hereinafter described, the isolation moats 21 would be cut through to provide the isolated islands.

After the moats and depth gauges have been formed as shown in FIG. 3, the oxide layers 14 are stripped by the utilization of a suitable etch, and thereafter insulating layers 24 in the form of silicon dioxide are regrown on the surfaces 12 and 13 and on the inclined surfaces which form the moats 21 and the depth gauges 22 and 23.

A support body 26 is then provided on the insulating layer 24 adherent to the surface 13. Typically, this can take the form of polycrystalline silicon which is deposited on the silicon dioxide layer 24 in a conventional manner.

The upper portion of the semiconductor body 11 is removed in a suitable manner such as by placing the structure which is shown in FIG. 4 in a lapping machine. Lapping is continued until the silicon dioxide layer which is formed in the moats 21 appears at the surface to provide a plurality of islands 27 formed of the monocrystalline silicon body 11 and which are dielectrically isolated from each other and the support body 26 by the insulating layer 24. Throughout this description, the term "lapping" is being used broadly to mean either lapping or polishing, the first of which uses coarse grit and the other of which uses fine grit. The lapping and polishing is continued until the maximum depth gauge 23 is exposed and is stopped before the minimum depth gauge 22 is exposed. This means that the lapping has continued until it is within a range between 12½ and 7½ microns to give the desired depth of approximately 10 microns for the isolated islands 27.

Thus, by utilization of the depth gauges, it is possible, by examination under a microscope, to determine within relatively close tolerances the depth to which lapping and polishing has been carried out. When only minimum and maximum depth gauges are utiilzed as shown in the preceding steps, it is known that as soon as the maximum depth gauge is exposed during the lapping operation that the islands which form a part of the semiconductor structure have a thickness which is within acceptable tolerance limits. If, by chance, the lapping operation should be continued until the minimum depth gauge 22 is exposed, this would mean that the lapping operation had been carried too far and that the depth of the islands would be insufficient and, therefore, the wafer or at least the portions which had been lapped too far would have to be discarded.

When the semiconductor structure has been brought to the condition shown in FIG. 5 in which the islands 27 have been isolated from each other, the semiconductor structure is ready for the subsequent conventional diffusion operations which are well know to those skilled in the art and which will hereinafter be briefly described.

In FIG. 6, there is shown an embodiment of the invention in which four depth gauges 31, 32, 33 and 34 have been utilized to provide even greater accuracy for determining the depth of lapping in dielectrically isolated integrated circuits. These depth gauges would be formed in the same way as hereinbefore described, the only exception being that two additional depth gauges are provided. The difference in elevation of the depth gauges could be substantially less; for example, if it is assumed that the correct thickness again is 10 microns, the depth gauges could have a difference in elevation between each two successive or preceding depth gauges of 2 microns. Thus, the depth gauges could have heights or elevations of 7, 9, 11 and 13 microns, respectively. The correct thickness is indicated by arrow 36 as being 10 microns. The lapping operation could be carried out so that the first depth gauge 31 and the second depth gauge 32 are exposed, but the third and fourth depth gauges 33 and 34 are not exposed. This would mean that as soon as the second depth gauge 32 is exposed and the depth gauge 33 is not exposed, that the lapping operation has been carried out to provide islands of the desired depth. The gradation between the depth gauges is represented by the inclined broken line 37.

In FIG. 7, there is shown a partial cross-sectional view and in FIG. 8, a partial plan view of a dielectrically isolated integrated circuit which is a high voltage hex inverter which contains six gates which are utilized for inverting signals. The circuit is also designed so that it can be utilized as four dual input gates. In construction of the device which is shown in FIGS. 7 and 8, substantially the same procedures were utilized as set forth in FIGS. 1–5 and the corresponding parts of the semiconductor structure have been given the same numbers. However, in the embodiment shown in FIGS. 7 and 8, the maximum depth gauge 41 and the minimum depth gauge 42 have been formed in islands 27 on opposite sides of the integrated circuit device. As is well known to those skilled in the art, many integrated circuits are formed on a single wafer and, therefore, in the embodiment shown in FIGS. 7 and 8, two depth gauges have been provided for each integrated circuit on the wafer. This makes it possible to readily ascertain which of the integrated circuits is within tolerance limits merely by checking the depth gauges for each of the integrated circuits.

As explained previously, as soon as the wafer has been polished to expose the maximum depth gauge 41 and not expose the minimum depth gauge 42, the semiconductor structure is ready for the diffusion operations. Such diffusion operations are conventional and are typically carried out by forming on the surface 28 and insulating or masking layer 30 in the form of silicon dioxide. Windows are etched into the layer 30 by suitable photolithographic techniques, and thereafter the base diffusion is carried out to form a dish-shaped P-N junction 46 which extends to the planar surface 28 so that there is provided a collector region 47 and a base region 48. Typically, the collector region 47 would have an N-type impurity already in it and the base region 48 would be formed by diffusing a P-type impurity through the window in the oxide.

Thereafter, windows are formed in the oxide for the emitter regions. With NPN type transistors, an N-type impurity would be diffused through the windows to provide N-type emitter regions 49 which are diffused within the base region 48 and which form dish-shaped P-N junctions 51 which extend to the planar surface 28. The oxide layer 30 is regrown in the windows during the emitter diffusion and thereafter additional windows formed in the oxide layer which overlie the collector, base and emitter regions. Thereafter, metallization of a suitable type such as aluminum is deposited over the oxide layer 28 and into the windows to provide a lead structure 52 which terminates in a plurality of pads (not shown) around the outer perimeter of the integrated circuit. The integrated circuit includes diodes and diffused resistors (not shown). As is well known to those skilled in the art, these diodes and diffused resistors can be formed at the same time that the transistors are being formed. For example, the diffused resistors and the diodes can be formed during the base diffusion of the transistors.

Although two depth gauges have only been shown in the embodiment of the invention shown in FIGS. 7 and 8, it should be appreciated that additional depth gauges can be utilized to obtain better depth control. The principal advantage of utilizing additional depth gauges is that once the maximum depth gauge has been penetrated, the additional depth gauges give an indication on how much further one can go before coming in contact with the minimum depth gauge. Thus, for example, if four depth gauges are utilized as hereinbefore explained, when the second depth gauge has been penetrated, it is known that there is only a very small distance remaining before the third depth gauge would be penetrated.

Although the depth gauges shown in FIGS. 7 and 8 have been included in isolated islands themselves, this is not necessary and the depth gauges could be placed in any portion of the semiconductor body which is not being utilized for the integrated circuit.

It is apparent from the foregoing that there has been provided a new and improved method and structure for ascertaining the depth to which lapping has been carried out in a dielectrically isolated integrated circuit. By utilizing larger numbers of depth gauges, any desired degree of preciseness can be obtained within certain limits. The formation of the depth gauges is compatible with the other steps in forming the integrated circuit and, therefore, do not complicate the manufacture of integrated circuits. The depth gauges are advantageous in that they can be viewed with a conventional microscope and, therefore, other expensive depth measuring equipment is unnecessary.

What is claimed is:

1. In a method for shaping a body of silicon having first and second sides in the formation of dielectrically isolated integrated circuits so that the body has a precise depth, forming by the use of an anisotropic etch at least two generally V-shaped grooves in said body extending inwardly from said first side of the body so that the grooves have apexes which terminate at different depths in said body within predetermined limits, forming a layer of silicon dioxide on said first side and in the apexes of the grooves, forming a polycrystalline silicon support structure upon said layer of silicon dioxide and removing silicon from the second side of the body using said grooves as depth gauges until at least some of the silicon dioxide in at least one of the apexes of the V-shaped grooves is exposed to thereby give an indication of the depth to which silicon has been removed from said second side of the body.

2. A method as in claim 1, wherein the apexes of the depth gauges differ in depth by approximately five microns or less.

3. A method as in claim 1, including forming isolation moats by the use of an anisotropic etch, which are generally V-shaped in cross-section and extend inwardly from said first side of the body and have a depth which is greater than the depth of any of the V-shaped grooves and forming a layer of silicon dioxide in said moats so that the silicon dioxide layer in the moats provides dielectrically isolated islands of silicon when at least one of the apexes of the V-shaped grooves is exposed.

4. A method as in claim 3 wherein the layer of silicon dioxide in the grooves is formed at the same time that the layer of silicon dioxide is formed in the moats.

5. A method as in claim 1, including forming more than two of said V-shaped grooves in the body of silicon and wherein silicon is removed from the second side of the body until some of the silicon dioxide in the apexes of at least two of the grooves is exposed.

6. A method as in claim 1, including forming active and passive devices in the islands and placing a metallization pattern on the body to interconnect the active and passive devices into an integrated circuit.

7. A method as in claim 1, wherein said silicon is removed from said second side by lapping.

References Cited

UNITED STATES PATENTS 3,419,956   1/1969   Kren et al. _____ 29—578

OTHER REFERENCES

E. I., June 1965, Status of Monolithic and Thin Film Circuits, pp. 38–42, vol. 24, No. 6.

E. E., December 1967, vol. 26, No. 11, pp. 14 and 16, Improved Etching Technique.

JACOB H. STEINBERG, Primary Examiner

U.S. Cl. X.R.

29—580; 73—290; 156—17; 317—235/22.11

Notice of Adverse Decision in Interference

In Interference No. 98,062 involving Patent No. 3,623,218, H. Mitarai, C. E. Nelson and A. P. Youmans, METHOD FOR DETERMINING DEPTH OF LAPPING OF DIELECTRICALLY ISOLATED INTEGRATED CIRCUITS, final judgment adverse to the patentees was rendered Dec. 4, 1973, as to claims 1, 2, 3, 4, 5, 6 and 7.

[*Official Gazette May 21, 1974.*]